United States Patent
Kim et al.

(10) Patent No.: US 12,510,729 B2
(45) Date of Patent: Dec. 30, 2025

(54) LENS ASSEMBLY AND ELECTRONIC DEVICE INCLUDING THE SAME

(71) Applicant: Samsung Electronics Co., Ltd., Gyeonggi-do (KR)

(72) Inventors: Hyunjea Kim, Gyeonggi-do (KR); Jaecheol Bae, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 397 days.

(21) Appl. No.: 17/890,513

(22) Filed: Aug. 18, 2022

(65) Prior Publication Data

US 2023/0121915 A1 Apr. 20, 2023

Related U.S. Application Data

(63) Continuation of application No. PCT/KR2022/008779, filed on Jun. 21, 2022.

(30) Foreign Application Priority Data

Oct. 20, 2021 (KR) .................. 10-2021-0140211

(51) Int. Cl.
*G02B 9/12* (2006.01)
*G02B 13/00* (2006.01)
*G03B 30/00* (2021.01)

(52) U.S. Cl.
CPC ........... *G02B 9/12* (2013.01); *G02B 13/0035* (2013.01); *G03B 30/00* (2021.01)

(58) Field of Classification Search
CPC ...... G02B 9/12; G02B 13/001; G02B 13/002; G02B 13/0035; G02B 9/34; G03B 30/00

(Continued)

(56) References Cited

U.S. PATENT DOCUMENTS 7,564,635 B1 7/2009 Tang
8,081,393 B2 12/2011 Chen et al.
(Continued)

FOREIGN PATENT DOCUMENTS

CN 111399191 A * 7/2020
JP 08-179194 A 7/1996
(Continued)

OTHER PUBLICATIONS

International Search Report dated Sep. 29, 2022.
Extended European Search Report dated Oct. 14, 2024.

*Primary Examiner* — Bumsuk Won
*Assistant Examiner* — Alex Park Rickel
(74) *Attorney, Agent, or Firm* — Cha & Reiter, LLC.

(57) ABSTRACT

A lens assembly and/or an electronic device including the same are provided. The lens assembly and/or the electronic device include an image sensor and three lenses sequentially arranged along an optical axis from an object side to an image sensor side. In the three lenses, a first lens disposed on the object side may include an object side surface convex toward the object and an image sensor side surface convex toward the image sensor while having positive power, a second lens may include an object side surface concave toward the image sensor while having negative power, and a third lens may have negative power. The lens assembly may satisfy the condition, $$0.1 \leq L12/L23 \leq 0.4,$$

wherein "L12" may be a distance or air gap between the first lens and the second lens, and "L23" may be a distance or air gap between the second lens and the third lens.

12 Claims, 14 Drawing Sheets

(58) Field of Classification Search
USPC .......................................... 359/784, 771, 763
See application file for complete search history.

(56) References Cited

U.S. PATENT DOCUMENTS

| | | | |
|---|---|---|---|
| 8,537,474 B1* | 9/2013 | Tsai | G02B 13/0035 359/716 |
| 8,625,207 B2 | 1/2014 | Goto et al. | |
| 9,658,431 B1 | 5/2017 | Tang et al. | |
| 2003/0193605 A1* | 10/2003 | Yamaguchi | G02B 13/0035 348/335 |
| 2008/0204896 A1 | 8/2008 | Shyu et al. | |
| 2008/0204899 A1 | 8/2008 | Saito | |
| 2009/0180200 A1 | 7/2009 | Amanai et al. | |
| 2009/0213475 A1 | 8/2009 | Tang | |
| 2009/0251802 A1 | 10/2009 | Chen et al. | |
| 2010/0231686 A1 | 9/2010 | Goto et al. | |
| 2010/0259838 A1* | 10/2010 | Tsai | G02B 13/18 359/716 |
| 2010/0321798 A1* | 12/2010 | Chen | G02B 13/0035 359/784 |
| 2011/0090392 A1* | 4/2011 | Tang | G02B 13/0035 359/716 |
| 2011/0122510 A1* | 5/2011 | Uchida | G02B 13/0035 359/716 |
| 2013/0120859 A1 | 5/2013 | Tsai et al. | |
| 2015/0085175 A1* | 3/2015 | Huang | G02B 3/04 359/713 |
| 2015/0109687 A1 | 4/2015 | Dai et al. | |
| 2016/0161712 A1 | 6/2016 | Jang et al. | |
| 2016/0227082 A1* | 8/2016 | Hsueh | G02B 13/0035 |
| 2017/0090154 A1* | 3/2017 | Hsieh | G02B 13/14 |
| 2017/0235101 A1 | 8/2017 | Huang et al. | |
| 2017/0269332 A1* | 9/2017 | Jhang | G02B 9/60 |
| 2018/0095244 A1* | 4/2018 | Lin | G02B 13/004 |

FOREIGN PATENT DOCUMENTS

| | | |
|---|---|---|
| JP | 2007-286345 A | 11/2007 |
| JP | 2008-76594 A | 4/2008 |
| JP | 2008-170851 A | 7/2008 |
| JP | 2009-169009 A | 7/2009 |
| JP | 2010-113306 A | 5/2010 |
| JP | 2018-185378 A | 11/2018 |
| KR | 10-2008-0035188 A | 4/2008 |
| KR | 20-2015-0001007 U | 3/2015 |
| KR | 10-2016-0069087 A | 6/2016 |
| WO | 2008/093438 A1 | 8/2008 |

* cited by examiner

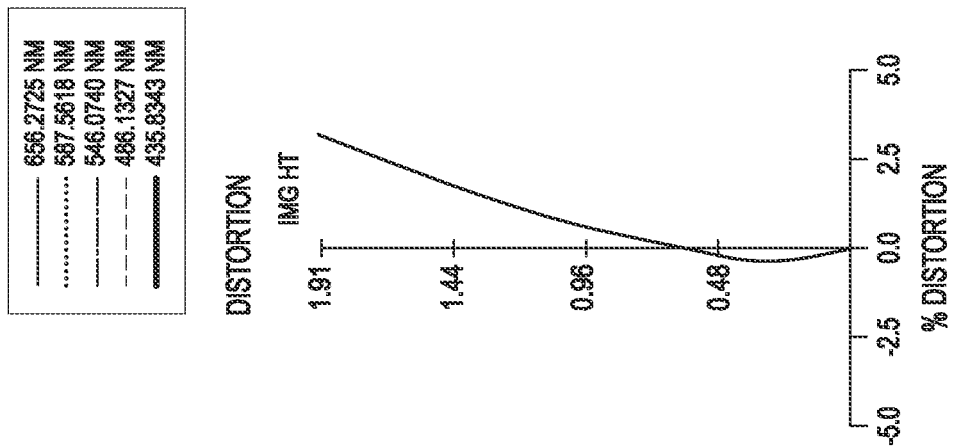
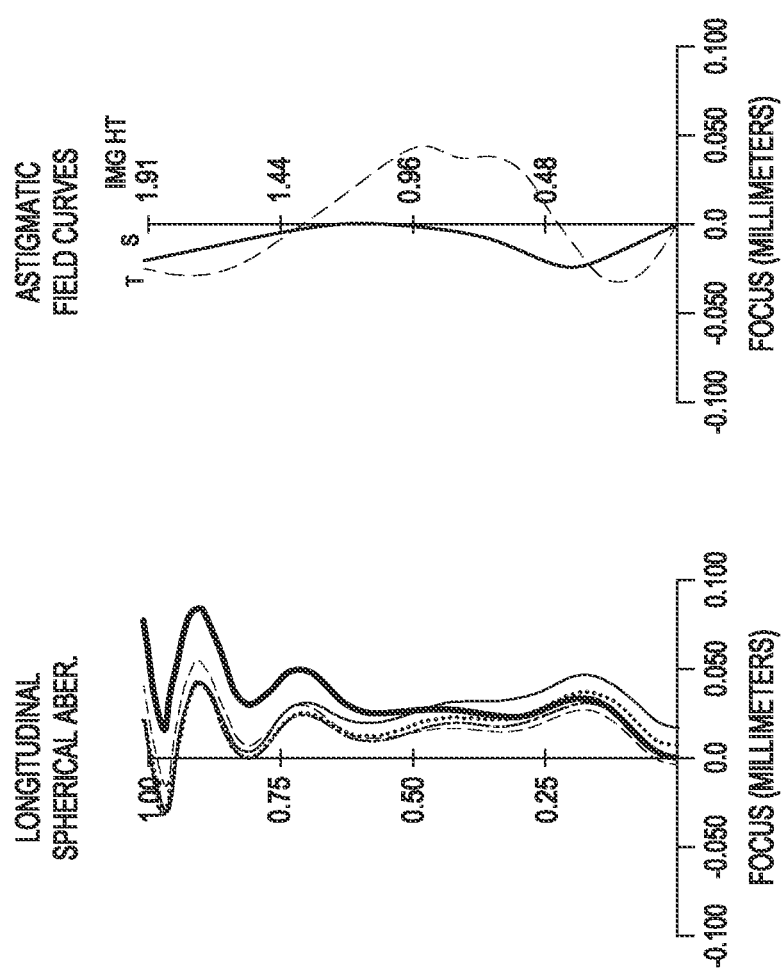
FIG. 10A  FIG. 10B  FIG. 10C

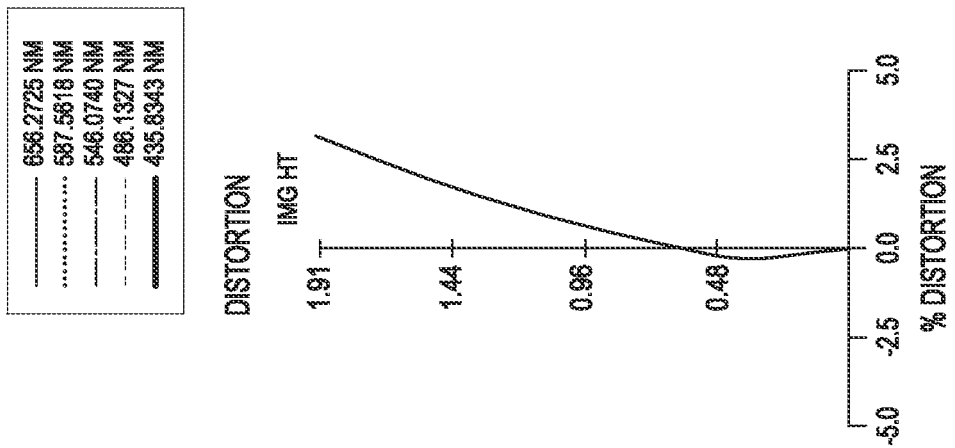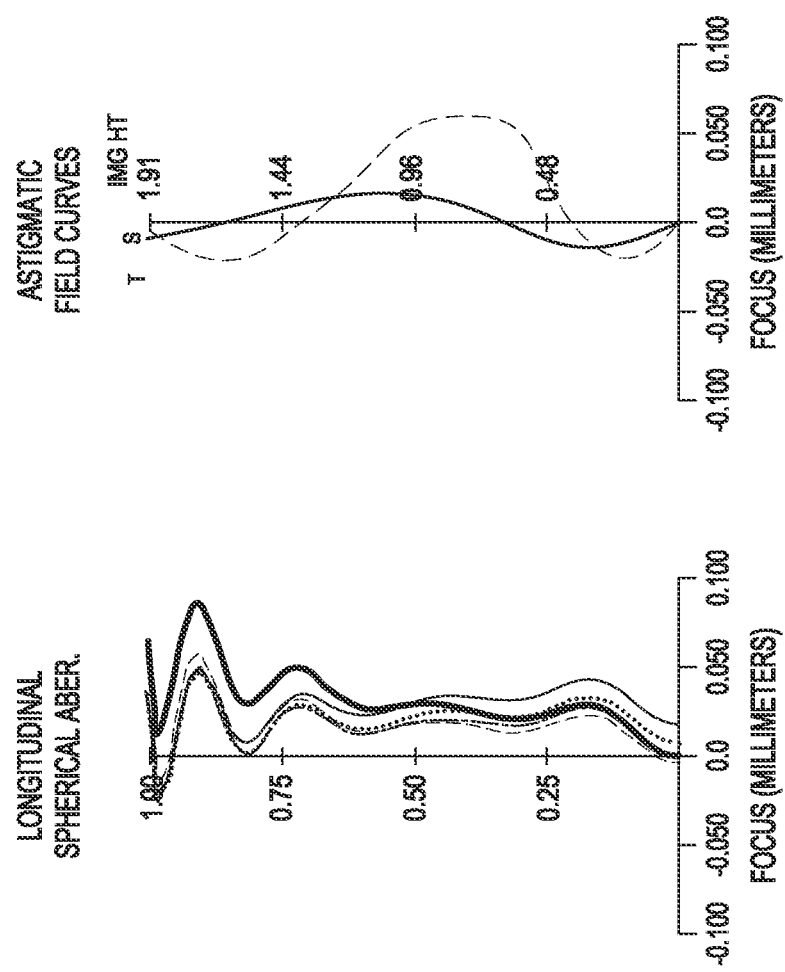
FIG. 12A  FIG. 12B  FIG. 12C

LENS ASSEMBLY AND ELECTRONIC DEVICE INCLUDING THE SAME

CROSS-REFERENCE TO RELATED APPLICATIONS

This application is a continuation of International Application No. PCT/KR2022/008779 designating the United States, filed on Jun. 21, 2022, in the Korean Intellectual Property Receiving Office and claiming priority to Korean Patent Application No. 10-2021-0140211, filed on Oct. 20, 2021, in the Korean Intellectual Property Office, the disclosures of all of which are incorporated by reference herein in their entireties

BACKGROUND

Technical Field

One or more embodiments of the instant disclosure generally relate to an electronic device. For example, certain embodiments relate to a lens assembly and/or an electronic device including the same.

Description of Related Art

Len assemblies, for example, ones included in cameras capable of taking pictures or videos have been widely used, and recently digital cameras each having a solid-state image sensor such as charge coupled device (CCD) or complementary metal-oxide semiconductor (CMOS) have become common. Lens assemblies employing solid-state image sensors (CCD or CMOS) are replacing film-type lens assemblies because, compared to film-type lens assemblies, it is easier to store and reproduce images and/or to transmit image data between electronic devices.

Recently, a plurality of lens assemblies, for example, two or more lens assemblies, implementing various types of cameras such as close-up camera (or macro lens camera), telephoto camera, and/or wide-angle camera, have been mounted in a single electronic device, thereby improving the quality of captured images. Furthermore, it has become possible to provide various visual effects to the captured images. For example, it is possible to obtain high-quality captured images by acquiring images of an object through the plurality of cameras having different optical characteristics and synthesizing the images. By being equipped with a plurality of lens assemblies (e.g., cameras) to acquire high-quality images, electronic devices such as mobile communication terminals and smartphones are gradually replacing electronic devices specialized for photography functions, such as digital cameras.

The above-described information may be provided as background for the purpose of helping understanding of the disclosure of this document. No claim or determination is made as to whether any of the foregoing may be applied as prior art regarding the disclosure of this document.

SUMMARY

As described above, a miniaturized electronic device, such as a smartphone, may include a standard angle-of-view camera, and may further include a wide-angle camera or a telephoto camera depending on the specifications of the electronic device. The standard angle of view camera may have a field of view (FOV) of, for example, about 60 degrees to about 80 degrees, and may be utilized as a close-up camera depending on the combination of the image sensor and lens(es) in the camera. "Close-up camera" may refer to a camera having a lens assembly that can be used to image an object within a distance of about 10 cm. In the miniaturized electronic device, the function of the standard angle-of-view camera and the function of the close-up camera may be implemented by using a lens assembly including three lenses and a low-pixel image sensor of about 50 million pixels or less. However, the close-up photography performance of the standard angle-of-view camera may be limited, and thus the close-up photography performance of the standard angle-of-view camera may be poor. On the other hand, with the development of solid-state image sensor technology, high-pixel image sensors of about 60 million pixels or more have been utilized, and the quality of the standard angle-of-view image has improved. However, when using a high-pixel image sensor and a lens assembly containing three lenses for close-up photography, the quality of zoomed images or cropped images may be deteriorated.

The problems to be solved in the disclosure are not limited to the above-mentioned problems, and may be include other problems without departing from the spirit and scope of the disclosure.

According to an embodiment of the disclosure, a lens assembly and/or an electronic device including the same may include an image sensor and three lenses sequentially arranged along an optical axis from an object side to an image sensor side, wherein, in the three lenses, a first lens disposed on the object side may include an object side surface convex toward the object and an image sensor side surface convex toward the image sensor while having positive power, a second lens disposed between the image sensor and the first lens may include an object side surface concave toward the image sensor while having negative power, and a third lens disposed between the image sensor and the second lens may have negative power, and wherein the lens assembly may satisfy Conditional Expression 1 below:

$$0.1 \leq L12/L23 \leq 0.4 \qquad \text{[Conditional Expression 1]}$$

wherein "L12" may be the distance or air gap between the first lens and the second lens, and "L23" may be the distance or air gap between the second lens and the third lens.

According to an embodiment of the disclosure, an electronic device may include a housing, a display device mounted on one surface of the housing, a lens assembly configured to receive or detect at least a portion of light incident on the one surface of the housing or another surface facing away from the one surface, wherein the lens assembly includes an image sensor and three lenses sequentially arranged along an optical axis from an object side to an image sensor side, and a processor configured to acquire an image based on the light received or detected via the lens assembly, wherein, in the three lenses, a first lens disposed on the object side may include an object side surface convex toward the object and an image sensor side surface convex toward the image sensor while having positive power, a second lens disposed between the image sensor and the first lens may include an object side surface concave toward the image sensor while having negative power, and a third lens disposed between the image sensor and the second lens may have negative power, and wherein the lens assembly may satisfy Conditional Expression 8 below:

$$0.1 \leq L12/L23 \leq 0.4 \qquad \text{[Conditional Expression 8]}$$

wherein "L12" may be a distance or air gap between the first lens and the second lens, and "L23" may be a distance or air gap between the second lens and the third lens.

Additional aspects will be set forth in part in the description which follows and, in part, will be apparent from the description, or may be learned by practice of the presented embodiments.

BRIEF DESCRIPTION OF THE DRAWINGS

The above-described aspects or other aspects, configurations, and/or advantages regarding various embodiments of the disclosure may become more apparent through the following detailed description made with reference to the accompanying drawings.

FIGS. 10A to 10C are graph representing, respectively, the spherical aberration, the astigmatism, and the distortion rate of the lens assembly according to still another one of various embodiments of the disclosure.

FIGS. 12A to 12C are graphs representing, respectively, the spherical aberration, the astigmatism, and the distortion rate of the lens assembly according to yet another one of various embodiments.

Throughout the appended drawings, like reference numerals may be assigned to like parts, components, and/or structures.

DETAILED DESCRIPTION

Certain embodiments of the disclosure are intended to at least solve the above-described problems and/or disadvantages and provide at least the advantages described below, and may provide a lens assembly including a small number of (e.g., three) lenses and have high magnification so as to be useful for close-up photography, and an electronic device including the lens assembly.

Certain embodiments of the disclosure may provide a lens assembly with high close-up photography performance while at the same time is miniaturized, and an electronic device including the lens assembly According to certain embodiments of the disclosure, a lens assembly and/or an electronic device including the same may be easily miniaturized. The lens assembly may include an image sensor of about 50 million pixels and three lenses. According to an embodiment, the three lenses may be configured to have high lens magnification (e.g., ×3), which may be useful for close-up photography. For example, it is possible to prevent or suppress deterioration of image quality even in zoomed images or cropped images. Accordingly, the lens assembly may be easily mounted in a miniaturized electronic device, and may contribute to improvement of close-up photography performance in the miniaturized electronic device.

The following description made with reference to the appended drawings may be provided in order to help comprehensive understanding of the various implementations of the disclosure defined by the claims and their equivalents. A specific embodiment disclosed in the following description includes various specific details to help understanding, but is considered to be one of various embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the various embodiments of the disclosure. Therefore, it will be obvious to those skilled in the art that the following description of various implementations of the disclosure is provided only for the purpose of explanation, not for the purpose of limiting the disclosure defined as the scope of rights and equivalents thereto.

It should be understood that the singular forms of "a", "an", and "the" contain plural meanings, unless the context clearly indicates otherwise. Thus, for example, "a component surface" may mean including one or more component surfaces.

Figure 1:
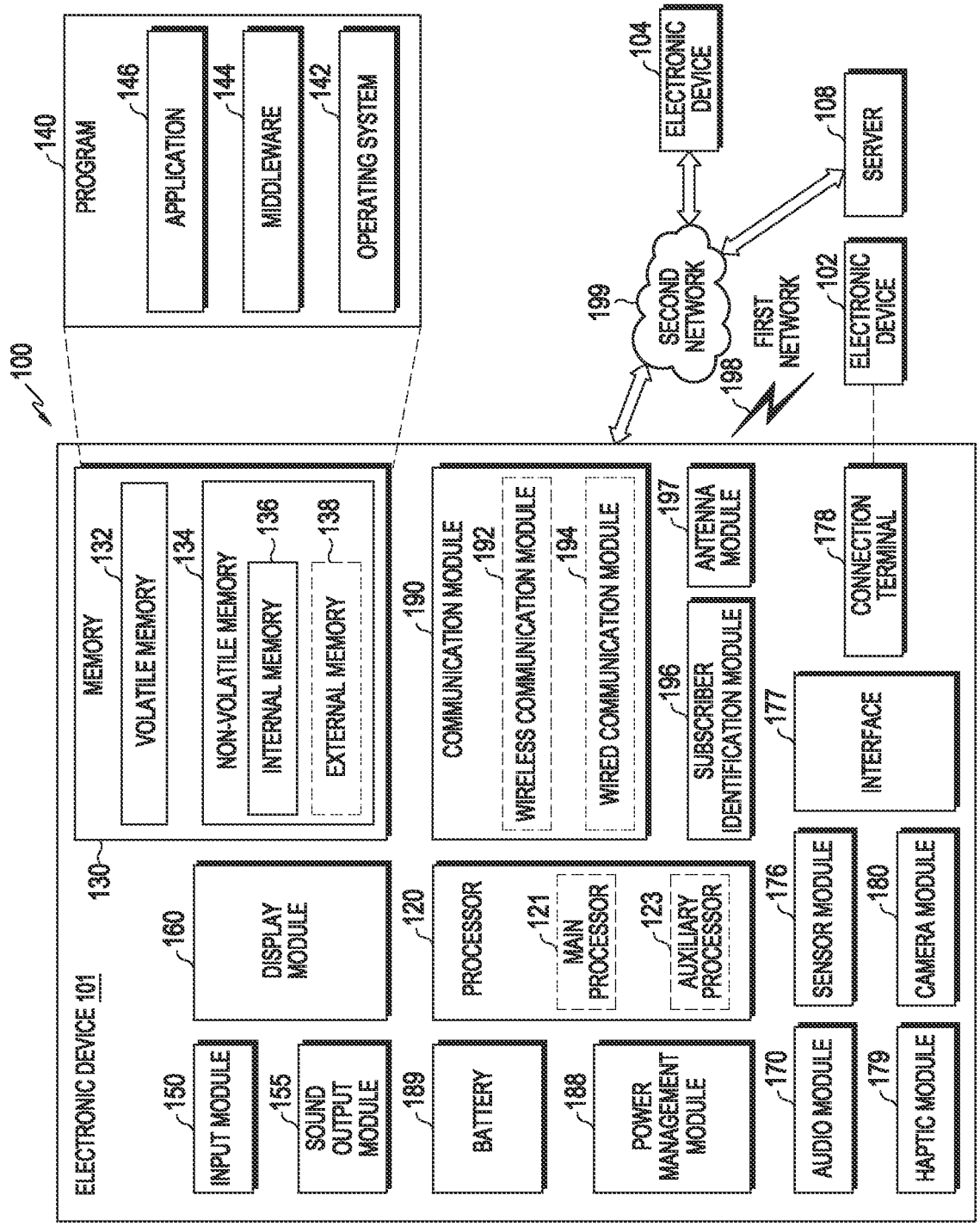
FIG. 1 is a block diagram of an electronic device according to an embodiment in a network environment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
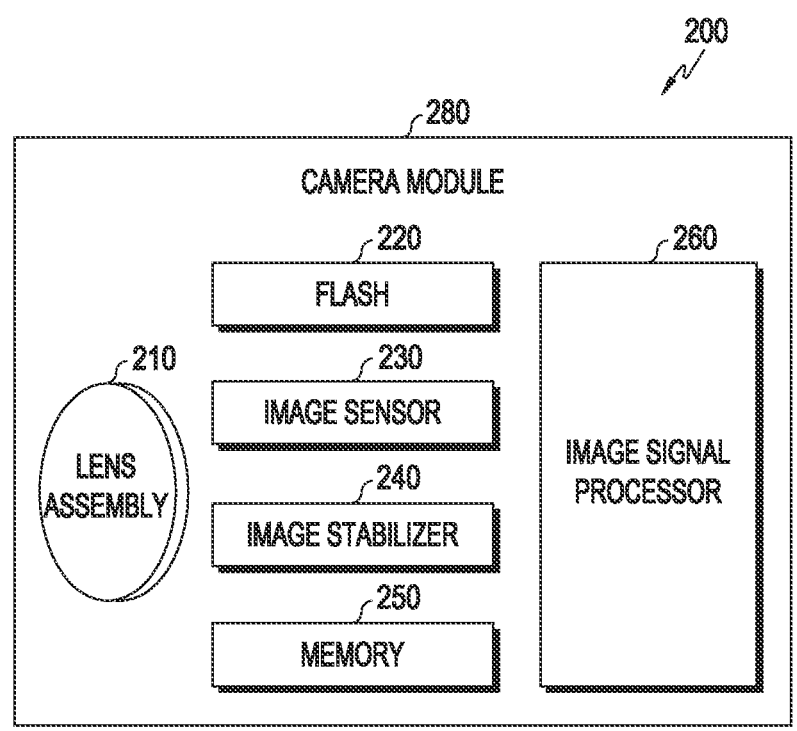
FIG. 2 is a block diagram exemplifying a camera module according to an embodiment.

FIG. 2 is a block diagram 200 illustrating a camera module 280 (e.g., the camera module 180 of FIG. 1) according to an embodiment.

Referring to FIG. 2, the camera module 280 may include a lens assembly 210, a flash 220, an image sensor 230, an image stabilizer 240, memory 250 (e.g., buffer memory), or an image signal processor 260.

In some embodiments, the lens assembly 210 may include the image sensor 230. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 180. This allows compensating for at least part of a negative effect (e.g., image blurring) by the movement on an image being captured. According to an embodiment, the image stabilizer 240 may sense such a movement by the camera module 280 or the electronic device (e.g., the electronic device 101 of FIG. 1) using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160 of FIG. 1. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory (e.g., the memory 130 of FIG. 1) or as a separate memory that is operated independently from the memory.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control, read-out timing control, etc.) with respect to at least one (e.g., the image sensor 230) of the components included in the camera module 280. An image processed by the image signal processor 260 may be stored back in the memory 250 for further processing, or may be provided to an external component (e.g., the memory 130, the display module 160, the electronic device 102, the electronic device 104, or the server 108 of FIG. 1) outside the camera module 280. According to an embodiment, the image signal processor 260 may be configured as at least part of the processor (e.g., the processor 120 of FIG. 1), or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device (e.g., the electronic device 101 of FIG. 1) may include a plurality of camera modules 280 having different attributes or functions. In such a case, at least one of the plurality of camera modules 280 may form, for example, a wide-angle camera and at least another of the plurality of camera modules 180 may form a telephoto camera. One of the plurality of camera modules 280 may be a close-up camera. Similarly, at least one of the plurality of camera modules 280 may form, for example, a front camera and at least another of the plurality of camera modules may form a rear camera.

Figure 3:
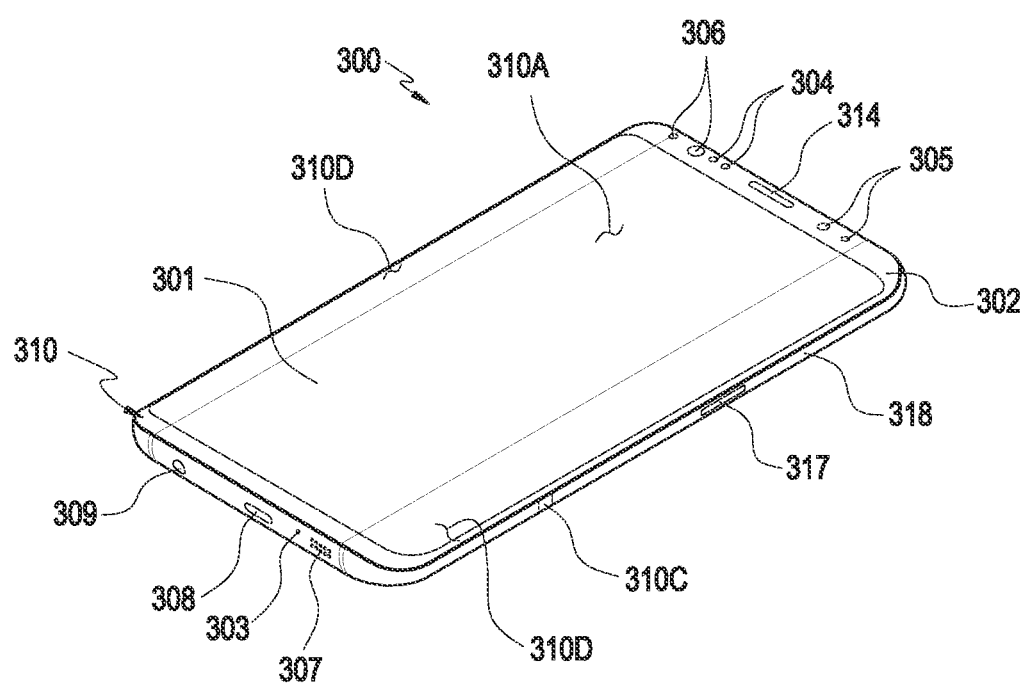
FIG. 3 is a perspective view illustrating the front side of an electronic device according to an embodiment.
Figure 4:
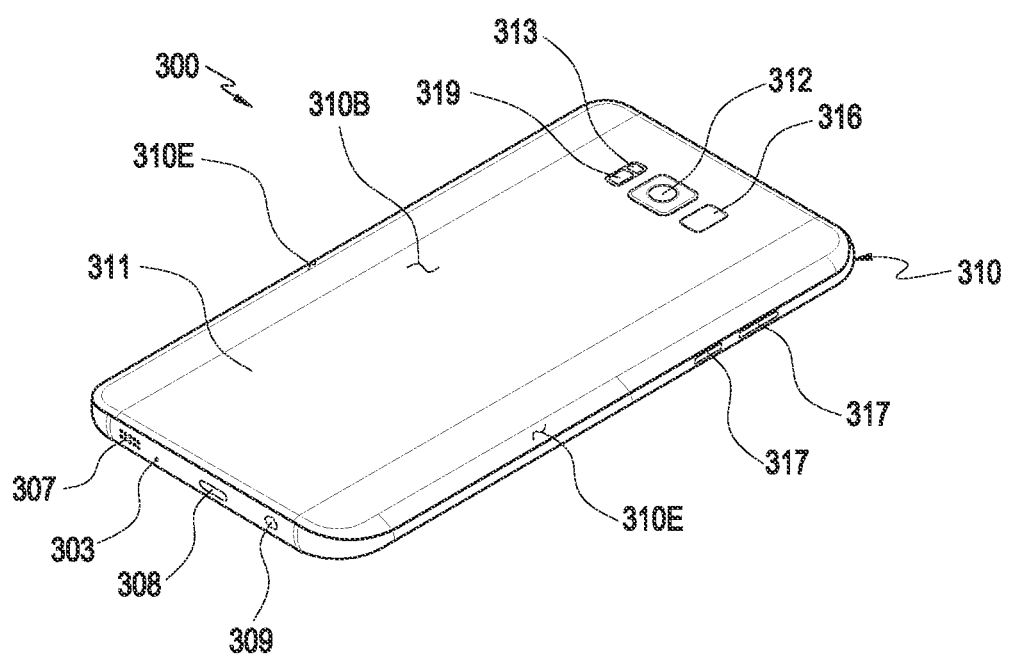
FIG. 4 is a perspective view illustrating the rear side of the electronic device illustrated in FIG. 3.

FIG. 3 is a perspective view illustrating the front side of an electronic device 300 (e.g., the electronic device 101 in FIG. 1) according to an embodiment. FIG. 4 is a perspective view illustrating the rear side of the electronic device 300 illustrated in FIG. 3.

Referring to FIGS. 3 and 4, the electronic device 300 (e.g., the electronic device 101 in FIG. 1) according to an embodiment may include a housing 310 including a first surface (or a front surface) 310A, a second surface (or a rear surface) 310B, and a side surface 310C surrounding a space between the first surface 310A and the second surface 310B. In another embodiment (not illustrated), the term "housing 310" may refer to a structure forming at least a part of the first surface 310A, the second surface 310B, and the side surface 310C of FIG. 3. According to an embodiment, at least a portion of the first surface 310A may be implemented by a substantially transparent front plate 302 (e.g., glass plate or polymer plate including various coating layers). In another embodiment, the front plate 302 may be coupled to the housing 310 so as to define an inner space with the housing 310. In certain embodiments, the term "inner space" may refer to the inner space of the housing 310 that accommodates at least a portion of a display 301 to be described later or the display module 160 in FIG. 1.

According to an embodiment, the second surface 310B may be implemented by a substantially opaque rear plate 311. The rear plate 311 may be made of, for example, coated or colored glass, ceramic, polymer, metal (e.g., aluminum, stainless steel (STS), or magnesium), or a combination of two or more of these materials. The side surface 310C may be defined by a side bezel structure (or "side member") 318 coupled to the front plate 302 and the rear plate 311 and including metal and/or polymer. In an embodiment, the rear plate 311 and the side bezel structure 318 may be integrated together, and may include the same material (e.g., metal material such as aluminum).

In the illustrated embodiment, the front plate 302 may include, at the longitudinal opposite edges thereof, two first regions 310D, which are bent from the first surface 310A toward the rear plate 311 and extend seamlessly. In the illustrated embodiment (see FIG. 4), the rear plate 311 may include, at the longitudinal opposite edges thereof, two second regions 310E, which are bent from the second surface 310B toward the front plate 302 and extend seamlessly. In an embodiment, the front plate 302 (or the rear plate 311) may include only one of the first regions 310D (or the second regions 310E). That is, in other embodiments, some of the first regions 310D or the second regions 310E may not be included. In the above-described embodiments, when viewed from a side of the electronic device 300, the side bezel structure 318 may have a first thickness (or width) on the side surface in which the first regions 310D or the second regions 310E are not included (e.g., the side surface in which the connector hole 308 is disposed), and may have a second thickness, which is smaller than the first thickness, on the side surface in which the first regions 310D or the second regions 310E are included (e.g., the side surfaces in which the key input devices 317 are disposed).

According to an embodiment, the electronic device 300 may include at least one of the display 301, audio modules 303, 307, and 314, sensor modules 304, 316, and 319, camera modules 305, 312, and 313 (e.g., the camera modules 180 and 280 in FIG. 1 or 2), key input devices 317 (e.g., the input module 150 in FIG. 1), light-emitting elements 306, and connector holes 308 and 309. In certain embodiments, at least one of the components (e.g., the key input devices 317 or the light-emitting elements 306) may be omitted from the electronic device 300, or the electronic device 300 may additionally include other components.

The display 301 (e.g., the display module 160 in FIG. 1) may be exposed through a substantial portion of, for example, the front plate 302. In an embodiment, at least a portion of the display 301 may be exposed through the front plate 302 defining the first surface 310A and the first regions 310D of the side surfaces 310C. In an embodiment, the edges of the display 301 may have substantially the same shape as the periphery of the front plate 302 adjacent thereto. In another embodiment (not illustrated), the distance between the periphery of the display 301 and the periphery of the front plate 302 may be substantially constant in order to maximize the exposed area of the display 301.

In another embodiment (not illustrated), recesses or openings may be provided in a portion of a screen display region (e.g., active region) of the display 301 or a region outside the screen display region (e.g., inactive region), and at least one of audio modules 314 (e.g., the audio module 170 in FIG. 1), sensor modules 304 (e.g., the sensor module 176 in FIG. 1), camera modules 305, and light-emitting elements 306 may be aligned with the recesses or the openings. In another embodiment, the rear surface of the screen display region of the display 301 may include at least one of audio modules 314, sensor modules 304, camera modules 305, fingerprint sensor 316, and light-emitting elements 306. In another embodiment (not illustrated), the display 301 may be coupled to or disposed adjacent to a touch-sensitive circuit, a pressure sensor capable of measuring touch intensity (pressure), and/or a digitizer configured to detect a magnetic field-type stylus pen. In some embodiments, at least some of the sensor modules 304 and 319 and/or at least some of the key input devices 317 may be disposed in the first regions 310D and/or the second regions 310E.

The audio modules 303, 307, and 314 may include a microphone hole 303 and speaker holes 307 and 314. The microphone hole 303 may include a microphone disposed therein so as to acquire external sound, and in certain embodiments, multiple microphones may be disposed therein so as to detect the direction of sound. The speaker holes 307 and 314 may include an external speaker hole 307 and a call receiver hole 314. In some embodiments, the speaker holes 307 and 314 and the microphone hole 303 may be implemented as a single hole, or a speaker (e.g., piezo speaker) may be included without the speaker holes 307 and 314.

The sensor modules 304, 316, and 319 may generate electrical signals or data values corresponding to the internal operating states or the external environmental states of the electronic device 300. The sensor modules 304, 316, and 319 may include, for example, a first sensor module 304 (e.g., proximity sensor), a second sensor module (not illustrated) (e.g., fingerprint sensor) disposed on the first surface 310A of the housing 310, a third sensor module 319 (e.g., heart-rate monitor (HRM) sensor), and/or a fourth sensor module 316 (e.g., fingerprint sensor) disposed on the second surface 310B of the housing 310. The fingerprint sensor may be disposed not only on the first surface 310A (e.g., the display 301) of the housing 310, but also on the second surface 310B or the side surface 310C. The electronic device 300 may further include at least one other sensor module (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may include one or more lenses, an image sensor, and/or an image signal processor. The flash 313 may include, for example, a light-emitting diode or a xenon lamp. In an embodiment, two or more lenses (e.g., an infrared camera lens, a close-up lens, a wide-angle lens, and/or a telephoto lens) and image sensors may be disposed on one surface of the electronic device 300.

The key input devices 317 may be disposed on the side surface 310C of the housing 310. In another embodiment, the electronic device 300 may not include some or all of the above-mentioned key input devices 317, and the key input device 317 not included may be implemented in another form, such as a soft key, on the display 301. In some embodiments, the key input devices may include a sensor module 316 disposed on the second surface 310B of the housing 310.

The light-emitting elements 306 may be disposed, for example, on the first surface 310A of the housing 310. The light-emitting elements 306 may provide, for example, information about the state of the electronic device 300 optically. In another embodiment, the light-emitting elements 306 may provide a light source that interworks with, for example, the camera modules 305. The light-emitting elements 306 may include, for example, an LED, an IR LED, and a xenon lamp.

The connector holes 308 and 309 may include a first connector hole 308, which is capable of accommodating a connector (e.g., USB connector) for transmitting/receiving power and/or data to/from an external electronic device, and/or a second connector hole 309, which is capable of accommodating a connector (e.g., earphone jack) for transmitting/receiving audio signals to/from an external electronic device.

Figure 5:
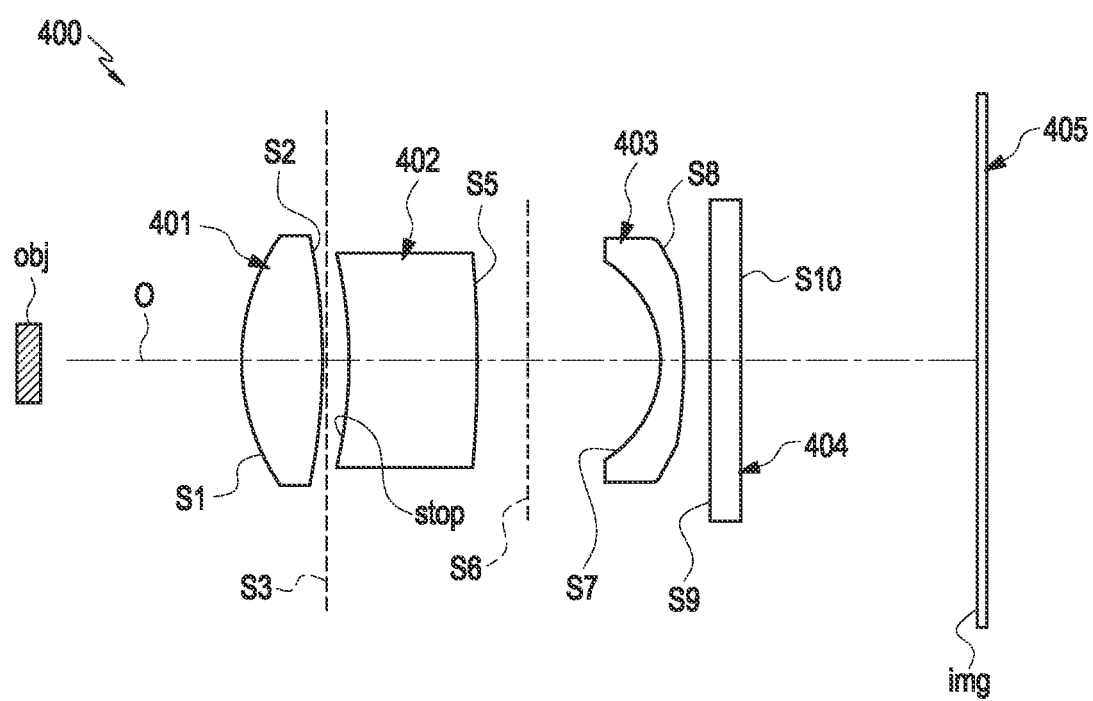
FIG. 5 is a configuration view illustrating a lens assembly according to one of an embodiment of the disclosure.

FIG. 5 is view illustrating a configuration of a lens assembly 400 (e.g., the camera module 180 in FIG. 1, or the camera module 280, the lens assembly 210, and/or the image sensor 230 in FIG. 2) according to an embodiment of the disclosure. FIGS. 6A to 6C are graphs illustrating, respectively, the spherical aberration, the astigmatism, and the distortion rate of the lens assembly 400 according to one of various embodiments of the disclosure.

Figure 6:
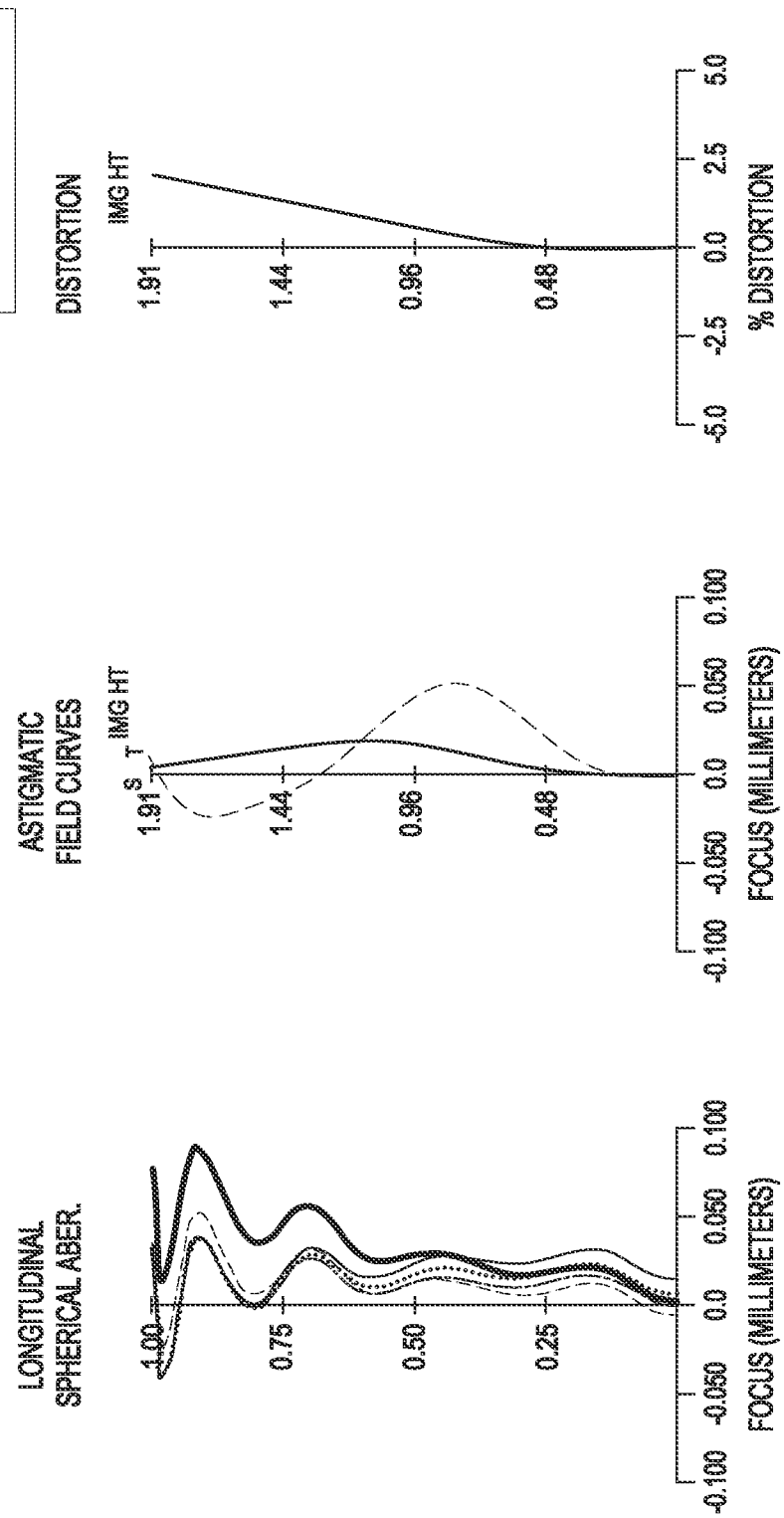
FIGS. 6A to 6C are graphs representing, respectively, the spherical aberration, the astigmatism, and the distortion rate of the lens assembly according to one of various embodiments of the disclosure.

Referring to FIGS. 5 and 6, the lens assembly 400 may include an image sensor 405 and three lenses 401, 402, and 403, and may be used as one of the camera module 180 in FIG. 1, the camera module 280 or the lens assembly 210 in FIG. 2, and/or the camera modules 305, 312, and 313 of FIGS. 3 and 4. For example, in the electronic device of FIG. 3 or FIG. 4, the lens assembly 400 may receive or detect light incident from the front surface (e.g., the first surface 310A in FIG. 3) or the rear surface (e.g., the second surface 310B in FIG. 4).

According to an embodiment, the lenses 401, 402, and 403 may include a first lens 401, a second lens 402, and/or a third lens 403 sequentially disposed along the direction of the optical axis O from an object obj side to an image sensor 405 side. In some embodiments, the lens assembly 400 may further include an infrared cut filter 404 disposed between the third lens 403 and the image sensor 405. In an embodiment, the second lens 402 may be disposed to directly face the first lens 401 and/or the third lens 403, and the infrared cut filter 404 may be disposed to directly face the third lens 403 and/or the image sensor 405.

According to an embodiment, the first lens on the object obj side, for example, the first lens 401, may include an object side surface S1 convex toward the object obj and an image sensor side surface S2 convex toward the image sensor 405 while having positive power. In an embodiment, when the first lens 401 has positive power, the total luminous flux is reduced, and thus the lens assembly 400 may be easily miniaturized. The shape of the first lens 401 may be appropriately selected according to specifications required by the lens assembly 400 and/or the electronic device (e.g., the electronic device 101 or 300 in FIG. 1, 3, or 4). For example, when the first lens 401 is a meniscus lens, the first lens may be easily miniaturized and may be implemented as an aspherical lens in consideration of aberration correction.

According to an embodiment, the second lens from the object obj side, for example, the second lens 402, may be disposed between the first lens 401 and the image sensor 405 and may be disposed to directly face the first lens 401. In an embodiment, a stop may be implemented between the first lens 401 and the second lens 402, and the present embodiment shows an example in which the stop is disposed on the object obj side of the second lens 402. When the stop is disposed on the object side surface of the second lens 402, it may be useful to provide sufficient quantity of light at the image periphery, and may suppress distortion or field curve. In an embodiment, the second lens 402 having negative power may include an object side surface (e.g., the surface on which the stop is disposed) concave toward the image sensor 405 and an image sensor side surface S5 convex toward the image sensor 405.

According to an embodiment, the third lens 403 may be disposed between the second lens 402 and the image sensor 405 and may be disposed to directly face the second lens 402. Depending on whether or not the infrared cut filter 404 is disposed, the third lens 403 may be disposed to directly face the infrared cut filter 404 or the image sensor 405. For example, the infrared cut filter 404 may be disposed between the third lens 403 and the image sensor 405. In an embodiment, the third lens 403 having negative power may include an object side surface S7 concave toward the image sensor 405 at the point intersecting the optical axis O, and an image sensor side surface S8 concave toward the object obj at the point intersecting the optical axis O. In some embodiments, the third lens 403 may be a meniscus lens including the above-described shapes of the lens surfaces S7 and S8. When the third lens 403 is a meniscus lens, aberration control may be improved.

According to an embodiment, when improving the close-up photography performance of the lens assembly 400, the angle of view may be decreased or the lens magnification may be increased. According to an embodiment, by increasing the distance between the second lens 402 and the third lens 403 or increasing the thickness of the second lens 402, the angle of view may be decreased or the lens magnification may be increased. When mounted in a miniaturized electronic device (e.g., the electronic device 101 or 300 in FIG. 1, FIG. 3, or FIG. 4), as the distance between the second lens 402 and the third lens 403 increases, the distance between the lens 401 and the second lens 402 may be decreased, and as the thickness of the second lens 402 is increased, the thickness of the third lens 403 may be decreased.

In an embodiment, in adjusting or decreasing the angle of view, the lens assembly 400 is capable of satisfying conditions presented through Equation 1 below regarding the distance between the second lens 402 and the third lens 403.

$$0.1 \leq L2/L23 \leq 0.4 \qquad \text{[Equation 1]}$$

Here, "L12" may be the distance or air gap between the first lens 401 and the second lens 402, and "L23" may be the distance or air gap between the second lens 402 and the third lens 403. According to [Equation 1], the distance L23 between the second lens 402 and the third lens 403 may be about 5 times more than the distance L12 between the first lens 401 and the second lens 402 or more. With this arrangement, it is possible to decrease the angle of view of the lens assembly 400. In implementing the miniaturized lens assembly 400 (and/or the electronic device 101 or 300 including the same), the distance L23 between the second lens 402 and the third lens 403 may be about 10 times the distance L12 between the first lens 401 and the second lens 402 and may further satisfy conditions presented by Equation 2 below.

$$0.15 \leq L23/TTL \leq 0.3 \qquad \text{[Equation 2]}$$

Here, "TTL" may be the distance from the object side surface S1 of the first lens 401 to the imaging surface img of the image sensor 405 along the optional axis O.

In another embodiment, in adjusting or decreasing the angle of view, the lens assembly 400 is capable of satisfying conditions presented through Equation 3 below regarding the thicknesses of the second lens 402 and the third lens 403.

$$3 \leq CT2/CT3 \leq 5 \qquad \text{[Equation 3]}$$

Here, "CT2" may be the thickness of the second lens 402, and "CT3" may be the thickness of the third lens 403. For example, the second lens 402 may have a thickness that is about three times or more the thickness of the third lens 403, thereby decreasing the angle of view or increasing the lens magnification of the lens assembly 400. In some embodiments, the second lens 402 may have a thickness of about 5 times or less the thickness of the third lens 403, thereby contributing to minimizing the lens assembly 400 or electronic device 101 or 300.

According to an embodiments, to improve the amount of peripheral light or suppress distortion or curvature, the lens assembly 400 may satisfy conditions presented by Equation 4 below regarding the position of the stop.

$$0.8 \leq StopL/TTL \leq 0.9 \qquad \text{[Equation 4]}$$

Here, "StopL" may be the distance from the stop to the imaging surface img of the image sensor 405. In satisfying the conditions Equation 4 as well as the above-mentioned Equations 1 to 3, the stop may be disposed on the object side of the second lens 402.

According to an embodiment, as the distance between the second lens 402 and the third lens 403 or the thickness of the second lens 402 increases, the angle of view of the lens assembly 400 may be decreased and the lens magnification may be increased. In some embodiments, the second lens 402 may have high refractive index and low Abbe's number, and the first lens 401 and the third lens 403 have high Abbe number, so that the lens assembly 400 may have an excellent dispersion property. For example, the lens assembly 400 according to certain embodiments may satisfy conditions presented through Equation 5 below.

$$100 \leq vd1 + vd2 + vd3 \leq 140 \qquad \text{[Equation 5]}$$

Here, "vd1" may be the Abbe number of the first lens 401, "vd2" may be the Abbe number of the second lens 402, and "vd3" may be the Abbe number of the third lens 403.

According to certain embodiments, the lens assembly 400 satisfying the above-described conditions may include lenses 401, 402, and 403 having effective shape diameters suitable for desired F number, distortion, and aberration control. In an embodiment, the lens assembly 400 may have effective focal length (EFL) of about 4.5 mm, F number (Fno) of about 3.4, and maximum image height (IH) of about 1.1814 mm, and/or effective field of view (FOV) of about 32.42 degrees.

In Table 1 below, the lens data of the lens assembly 400 illustrated in FIG. 5 is presented, in which "S1-S2" may indicate the object obj side surface S1 and the image sensor 405 side surface S2 of the first lens 401, "stop-S5" may indicate the object side surface and the image sensor 405 side surface S5 of the second lens 402. In this case "stop" refers to the stop that is disposed on the object obj side surface of the second lens 402. In Table 1, "S7-S8" may indicate the object obj side surface S7 and the image sensor 405 side surface S8 of the third lens 403, "S9-S10" may indicate the object obj side surface S9 and the image sensor 405 side surface S10 of the infrared cut filter 404, and "img" may indicate the imaging surface of the image sensor 405. In an embodiment, "S3" or "S6" in Table 1 may refer to a region, location, or plane in which a structure for controlling aberration or blocking stray light is disposed. In an embodiment, the structure for controlling aberration or blocking stray light may affect the size of an aperture and/or adjusting the amount of light bundles per field while serving as a structure for fixing the lens(s). In another embodiment, the structure for controlling aberration or blocking stray light may be implemented by film, and in another embodiment, may include an iris. For example, "S3" or "S6" may provide the function of controlling aberration or blocking noise according to the design specification of the lens assembly 400. In some embodiments, the "curvature radius" in Table 1 may be the curvature radius of a lens surface measured at the point intersecting the optical axis, the "thickness or air gap" may be the thickness of a lens or the distance between lenses measured at the points intersecting the optical axis, the "effective shape diameter" may be a value obtained by measuring the diameter of a region of a lens through which light passes, the region centered at the point intersecting the optical axis.

TABLE 1

| Lens surfaces | Curvature radius | Thickness or air gap | Focal distance (EFL) | Refractive index (nd) | Abbe number (vd) | Effective shape diameter (H-Ape) |
| --- | --- | --- | --- | --- | --- | --- |
| S1 | 1.49355 | 0.56231 | 2.407 | 1.53500 | 55.75 | 0.90000 |
| S2 | −8.37866 | 0.03000 | | | | 0.87000 |
| S3 | Infinity | 0.16815 | | | | 0.82000 |
| stop | −3.15287 | 0.92084 | −7.689 | 1.67074 | 19.23 | 0.78000 |
| S5 | −8.90146 | 0.49746 | | | | 0.66000 |
| S6 | Infinity | 0.70970 | | | | 0.69000 |
| S7 | −2.63086 | 0.28048 | −3.853 | 1.54397 | 55.93 | 0.73000 |
| S8 | 10.93038 | 0.20000 | | | | 0.93000 |
| S9 | Infinity | 0.21000 | infinity | 1.51680 | 64.2 | |
| S10 | Infinity | 1.68722 | | | | |
| img | Infinity | 0.01385 | | | | |

According to an embodiment, since the lens assembly 400 includes the three lenses 401, 402, and 403, the lens assembly may be easily miniaturized and may be easily mounted in a miniaturized electronic device 101 or 300 such as a smartphone. In an embodiment, the lens assembly 400 may decrease the angle of view and increase the lens magnification through the adjustment the distance between the second lens 402 and the third lens 403 or the thickness of the second lens 402. For example, the lens assembly 400 may have improved close-up photography performance, and may prevent deterioration of the quality of zoomed images or cropped images in close-up photography when using a low-pixel image sensor of about 50 million pixels or less.

Figure 7:
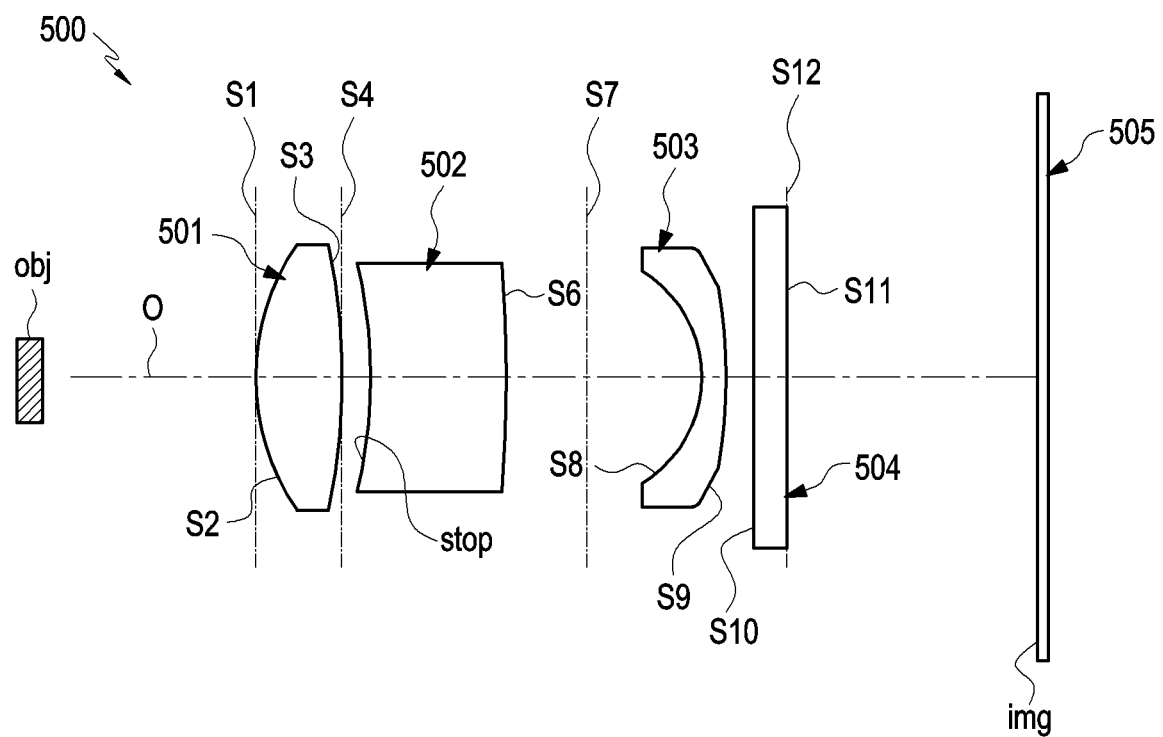
FIG. 7 is a view illustrating the configuration of a lens assembly according to another one of various embodiments of the disclosure.

FIG. 7 is a view illustrating the configuration of a lens assembly 500 (e.g., the lens assembly 400 in FIG. 5) according to one of various embodiments of the disclosure. FIGS. 8A to 8C are graphs respectively illustrating spherical aberration, astigmatism, and distortion rate of the lens assembly 500 according to one of various embodiments of the disclosure.

Figure 8:
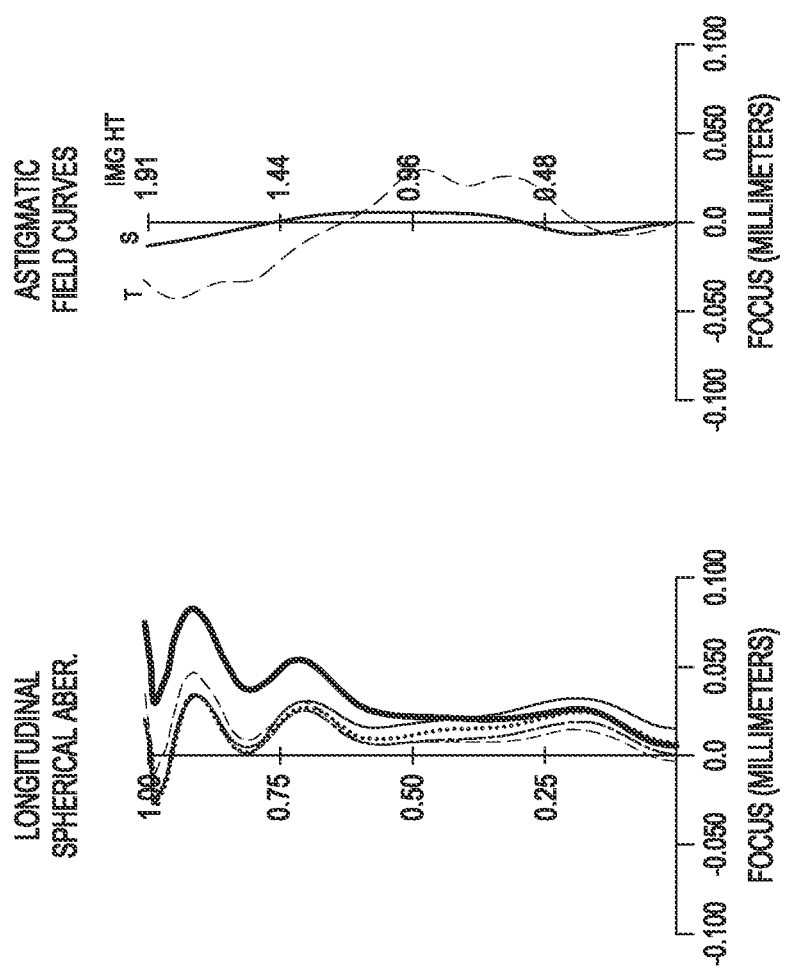
FIGS. 8A to 8C are graphs representing, respectively, the spherical aberration, the astigmatism, and the distortion rate of the lens assembly according to another one of various embodiments of the disclosure.

Referring to FIGS. 7 and 8, the lens assembly 500 may include a first lens 501, a second lens 502, and/or a third lens 503 sequentially disposed along the direction of the optical axis O from the object obj side to the image sensor 505 side, and may satisfy conditions presented through at least one of Equations of the above-described embodiment. In an embodiment, the lens assembly 500 may be utilized as any one of the camera module 180 of FIG. 1, the camera module 280 or the lens assembly 210 of FIG. 2 and/or the camera modules 305, 312, and 313 of FIGS. 3 and 4. According to an embodiment, the lens assembly 500 may further include an infrared cut filter 504 disposed between the third lens 503 and the image sensor 505. In an embodiment, the second lens 502 may be disposed to directly face the first lens 501 and/or the third lens 503, and the infrared cut filter 504 may be disposed to directly face the third lens 503 and/or the image sensor 505.

In Table 2 below, the lens data of the lens assembly 500 illustrated in FIG. 7 is presented, in which "S2-S3" may indicate the object obj side surface S2 and the image sensor 505 side surface S3 of the first lens 501, "stop-S6" may indicate the object side surface and the image sensor 505 side surface S6 of the second lens 502. In this case, "stop" refers to the stop that is disposed on the object obj side surface of the second lens 502. In Table 2, "S8-S9" may indicate the object obj side surface S8 and the image sensor 505 side surface S9 of the third lens 503, "S10-S11" may indicate the object obj side surface S10 and the image sensor 505 side surface S11 of the infrared cut filter 504, and "img" may indicate the imaging surface of the image sensor 505. In an embodiment, "S1", "S4", "S7", or "S12" in Table 2 may refer to a region, location, or plane in which a structure for controlling aberration or blocking stray light is disposed, and is similar to "S3" or "S6" in FIG. 5. Duplicative description thereof will be omitted. In some embodiments, the "curvature radius" in Table 2 may be the curvature radius of a lens surface measured at a point intersecting the optical axis, the "thickness or air gap" may be the thickness of a lens or the distance between lenses measured at the points intersecting the optical axis, the "effective shape diameter" may be a value obtained by measuring the diameter of a region of a lens through which light passes, the region centered at the point intersecting the optical axis. In some embodiments, at least one of the lens surfaces may be an aspherical surface, and in Table 2, symbol "*" indicates aspherical lens surfaces.

TABLE 2

| Lens surfaces | Curvature radius | Thickness or air gap | Focal distance (EFL) | Refractive index (nd) | Abbe number (vd) | Effective shape diameter (H-Ape) |
|---|---|---|---|---|---|---|
| Obj | infinity | 30 | | | | 9.37892 |
| S1 | infinity | 0.00000 | | | | 0.97981 |
| S2* | 1.54889 | 0.54650 | 2.420 | 1.53500 | 55.75 | 0.90700 |
| S3 * | −7.10807 | 0.03000 | | | | 0.87294 |
| S4 | infinity | 0.16590 | | | | 0.81990 |
| Stop | −3.13664 | 0.81918 | −7.254 | 1.67074 | 19.23 | 0.78400 |
| S6 * | −9.55111 | 0.62003 | | | | 0.66000 |
| S7 | infinity | 0.83227 | | | | 0.69285 |
| S8* | −2.64211 | 0.22909 | −3.954 | 1.54397 | 55.93 | 0.73000 |
| S9 * | 12.20044 | 0.20000 | | | | 0.91217 |
| S10 | infinity | 0.21000 | infinity | 1.51680 | 64.2 | 1.10397 |
| S11 | infinity | 0.00000 | | | | 1.16707 |
| S12 | infinity | 1.51876 | | | | 1.16707 |
| Img | infinity | 0.01500 | | | | 1.93307 |

Figure 9:
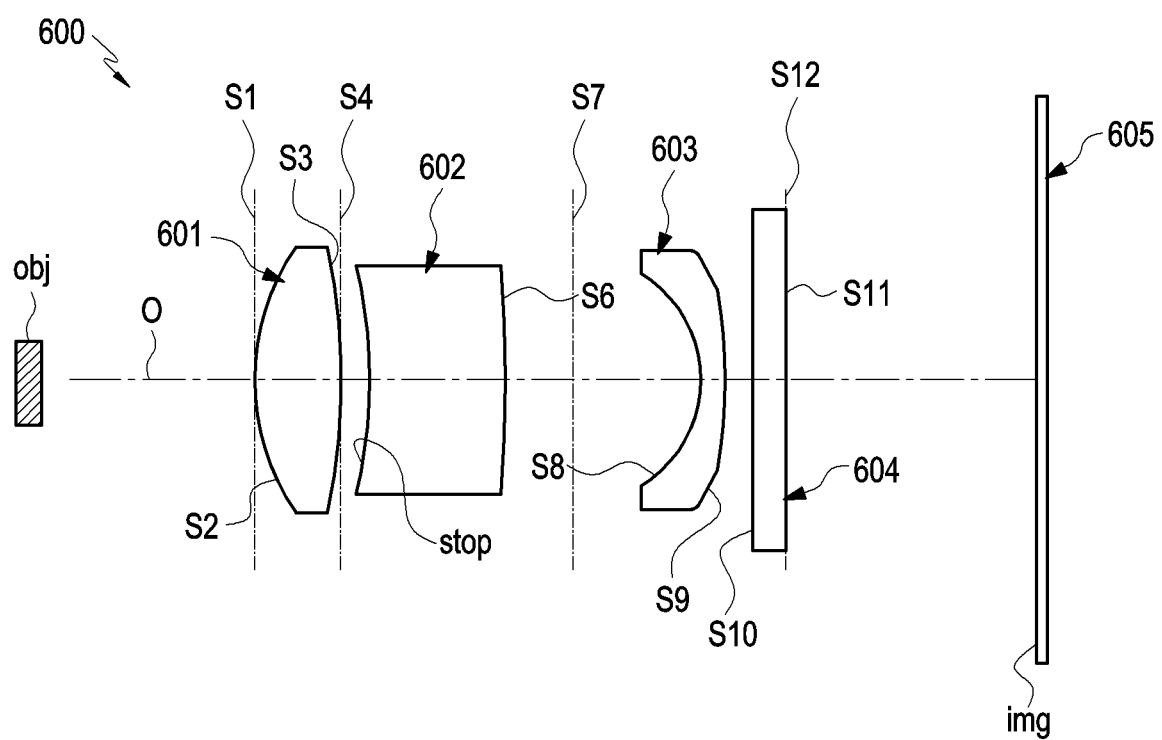
FIG. 9 is a view illustrating the configuration of a lens assembly according to still another one of various embodiments of the disclosure.

FIG. 9 is a configuration view illustrating a lens assembly 600 (e.g., the lens assembly 400 in FIG. 5) according to another one of various embodiments of the disclosure. FIGS. 10A to 10C are graphs respectively illustrating spherical aberration, astigmatism, and distortion rate of the lens assembly 600 according to another one of various embodiments of the disclosure.

Referring to FIGS. 9 and 10, the lens assembly 600 may include three lenses 601, 602, and 603 sequentially disposed along the direction of the optical axis O from the object obj side to the image sensor 605 side, and may satisfy conditions presented through at least one of Equations of the above-described embodiments. According to an embodiment, the lens assembly 600 may further include an infrared cut filter 604 disposed between the third lens 603 and the image sensor 605. The arrangement of the lenses 601, 602, and 603, the infrared cut filter 604, and/or the image sensor 605, and the configurations of lens surfaces are similar to those of the lens assembly 500 of FIG. 7, and thus detailed description thereof will be omitted. In Table 3, the lens data of the lens assembly 600 illustrated in FIG. 9 are presented.

TABLE 3

| Lens surfaces | Curvature radius | Thickness or air gap | Focal distance (EFL) | Refractive index (nd) | Abbe number (vd) | Effective shape diameter (H-Ape) |
|---|---|---|---|---|---|---|
| Obj | infinity | 30 | | | | 9.39244 |
| S1 | infinity | 0.00000 | | | | 0.98248 |
| S2* | 1.49849 | 0.56171 | 2.410 | 1.53480 | 55.71 | 0.90700 |

TABLE 3-continued

| Lens surfaces | Curvature radius | Thickness or air gap | Focal distance (EFL) | Refractive index (nd) | Abbe number (vd) | Effective shape diameter (H-Ape) |
|---|---|---|---|---|---|---|
| S3 * | −8.24927 | 0.03000 | | | | 0.87032 |
| S4 | infinity | 0.16627 | | | | 0.81827 |
| Stop | −3.13528 | 0.95000 | −8.011 | 1.67074 | 19.23 | 0.78400 |
| S6 * | −8.31009 | 0.47366 | | | | 0.66000 |
| S7 | infinity | 0.67891 | | | | 0.69830 |
| S8* | −2.63521 | 0.22000 | −3.987 | 1.53730 | 55.81 | 0.73000 |
| S9 * | 12.05858 | 0.20000 | | | | 0.90226 |
| S10 | infinity | 0.21000 | infinity | 1.51680 | 64.2 | 1.07158 |
| S11 | infinity | 0.00000 | | | | 1.12907 |
| S12 | infinity | 1.77108 | | | | 1.12907 |
| Img | infinity | 0.01500 | | | | 1.91937 |

Figure 11:
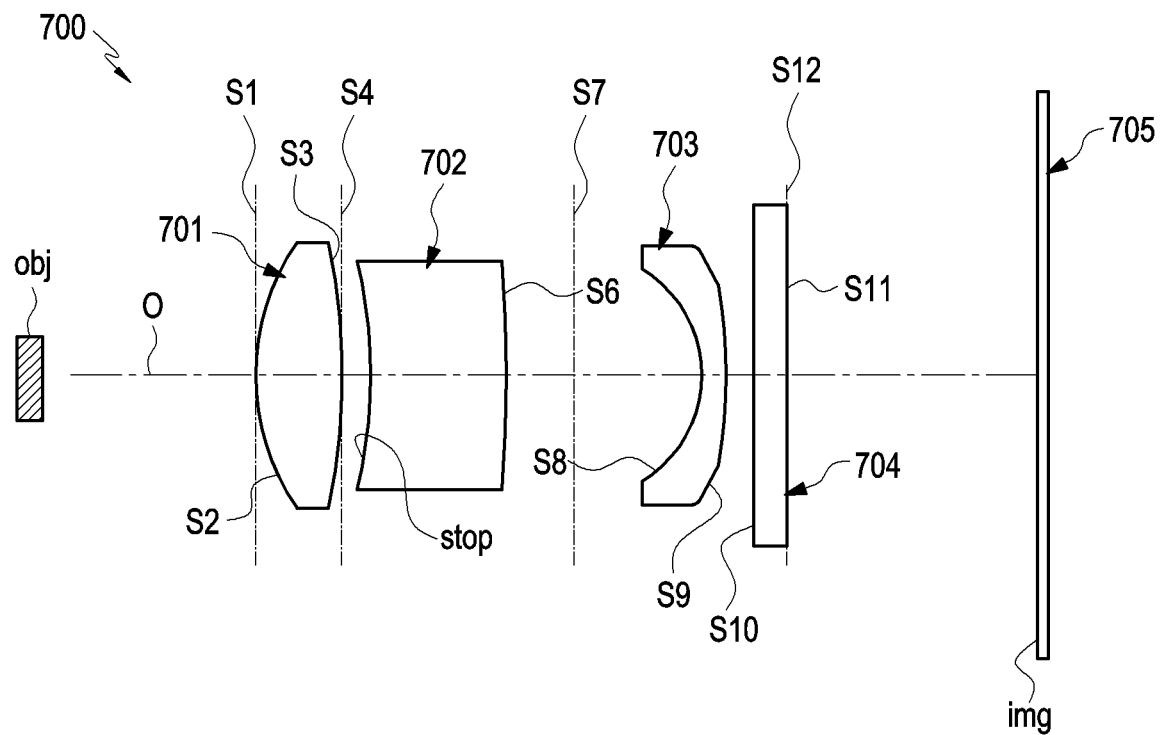
FIG. 11 is a view illustrating the configuration of a lens assembly according to yet another one of various embodiments of the disclosure.

FIG. 11 is a view illustrating the configuration of a lens assembly 700 (e.g., the lens assembly 400 in FIG. 5) according to yet another one of various embodiments of the disclosure. FIGS. 12A to 12C are graphs respectively illustrating spherical aberration, astigmatism, and distortion rate of the lens assembly 700 according to yet another one of various embodiments of the disclosure.

Referring to FIGS. 11 and 12, the lens assembly 700 may include three lenses 701, 702, and 703 sequentially disposed along the direction of the optical axis O from the object obj side to the image sensor 705 side, and may satisfy conditions presented through at least one of Equations of the above-described embodiments. According to an embodiment, the lens assembly 700 may further include an infrared cut filter 704 disposed between the third lens 703 and the image sensor 705. The arrangement of the lenses 701, 702, and 703, the infrared cut filter 704, and/or the image sensor 705, and the configurations of lens surfaces are similar to those of the lens assembly 500 of FIG. 7, and thus detailed description thereof will be omitted. In Table 4, the lens data of the lens assembly 700 illustrated in FIG. 11 are presented.

Figure 13:
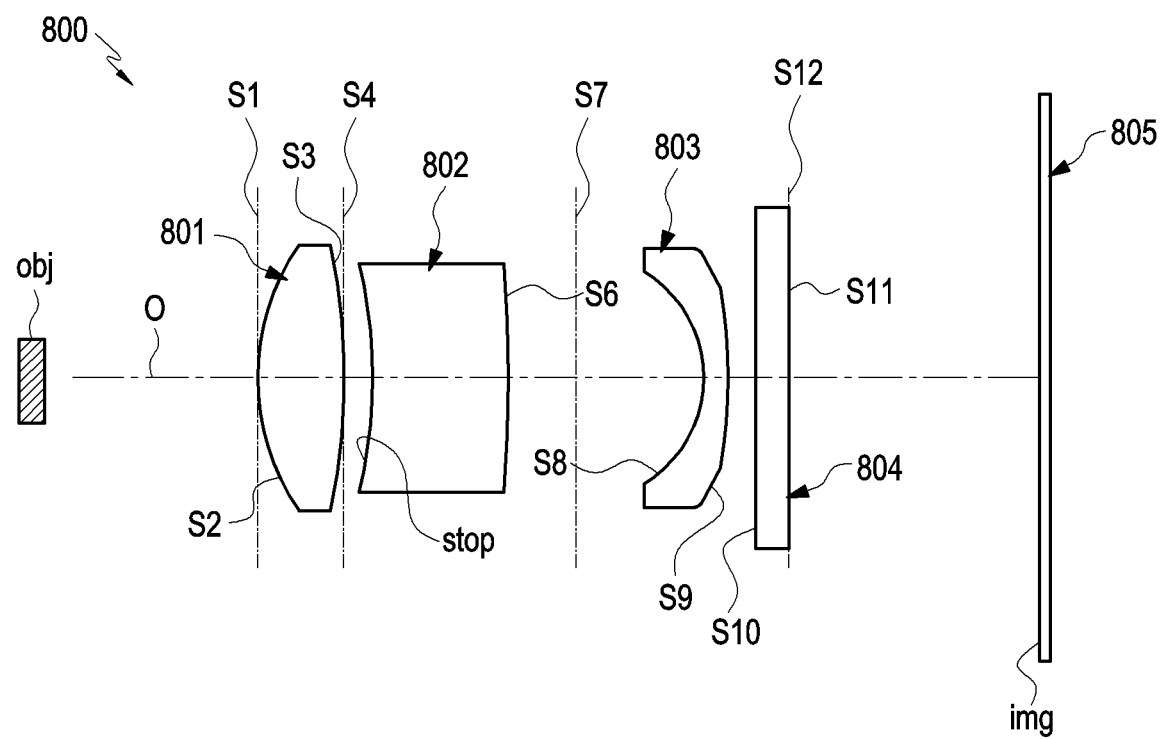
FIG. 13 is a view illustrating the configuration of a lens assembly according to yet another one of various embodiments of the disclosure.
Figures 14A, 14B, 14C:
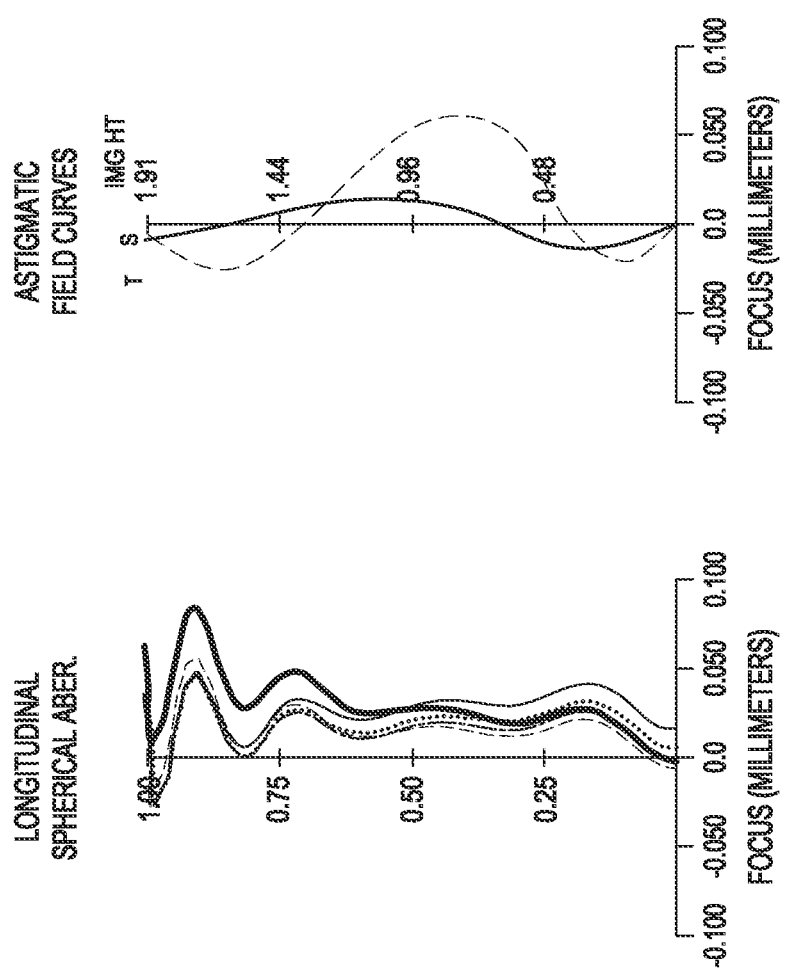
FIGS. 14A to 14C are graphs representing, respectively, the spherical aberration, the astigmatism, and the distortion rate of the lens assembly according to yet another one of various embodiments.

FIG. 13 is a view illustrating the configuration of a lens assembly 800 (e.g., the lens assembly 400 in FIG. 5) according to still yet another one of various embodiments of the disclosure. FIGS. 14A to 14C are graphs respectively illustrating spherical aberration, astigmatism, and distortion rate of the lens assembly 800 according to still yet another one of various embodiments of the disclosure.

Referring to FIGS. 13 and 14, the lens assembly 800 may include three lenses 801, 802, and 803 sequentially disposed along the direction of the optical axis O from the object obj side to the image sensor 805 side, and may satisfy conditions presented through at least one of Equations of the above-described embodiments. According to an embodiment, the lens assembly 800 may further include an infrared cut filter 804 disposed between the third lens 803 and the image sensor 805. The arrangement of the lenses 801, 802, and 803, the infrared cut filter 804, and/or the image sensor 805, and the configurations of lens surfaces are similar to those of the lens assembly 500 of FIG. 7, and thus detailed description thereof will be omitted. In Table 5, the lens data of the lens assembly 800 illustrated in FIG. 13 are presented.

TABLE 4

| Lens surfaces | Curvature radius | Thickness or air gap | Focal distance (EFL) | Refractive index (nd) | Abbe number (vd) | Effective shape diameter (H-Ape) |
|---|---|---|---|---|---|---|
| Obj | infinity | 30 | | | | 9.40225 |
| S1 | infinity | 0.00000 | | | | 0.98301 |
| S2* | 1.49077 | 0.56134 | 2.398 | 1.53642 | 55.78 | 0.90700 |
| S3 * | −8.40072 | 0.04671 | | | | 0.86730 |
| S4 | infinity | 0.16973 | | | | 0.80772 |
| Stop | −3.07553 | 0.95000 | −7.873 | 1.67074 | 19.23 | 0.76809 |
| S6 * | −8.14846 | 0.43505 | | | | 0.66000 |
| S7 | infinity | 0.64729 | | | | 0.69399 |
| S8* | −2.63177 | 0.25047 | −4.038 | 1.53616 | 55.76 | 0.73000 |
| S9 * | 12.92113 | 0.20000 | | | | 0.91547 |
| S10 | infinity | 0.21000 | infinity | 1.51680 | 64.2 | 1.08171 |
| S11 | infinity | 0.00000 | | | | 1.13791 |
| S12 | infinity | 1.79441 | | | | 1.13791 |
| Img | infinity | 0.01500 | | | | 1.92099 |

TABLE 5

| Lens surfaces | Curvature radius | Thickness or air gap | Focal distance (EFL) | Refractive index (nd) | Abbe number (vd) | Effective shape diameter (H-Ape) |
|---|---|---|---|---|---|---|
| Obj | infinity | 30 | | | | 9.4571 |
| S1 | infinity | 0.00000 | | | | 0.98355 |
| S2* | 1.50135 | 0.60991 | 2.366 | 1.54158 | 55.99 | 0.90700 |
| S3 * | −7.70951 | 0.08937 | | | | 0.87505 |
| S4 | infinity | 0.22732 | | | | 0.80845 |
| stop | −2.75189 | 0.95000 | −6.997 | 1.67074 | 19.23 | 0.78400 |
| S6 * | −7.45420 | 0.37085 | | | | 0.66000 |
| S7 | infinity | 0.58310 | | | | 0.69647 |
| S8* | −2.63584 | 0.24634 | −4.268 | 1.54410 | 56.09 | 0.73000 |
| S9 * | 20.91901 | 0.20000 | | | | 0.91483 |
| S10 | infinity | 0.21000 | infinity | 1.51680 | 64.2 | 1.09045 |
| S11 | infinity | 0.00000 | | | | 1.14994 |
| S12 | infinity | 1.64489 | | | | 1.14994 |
| img | infinity | 0.01500 | | | | 1.91510 |

As described above, according to an embodiment of the disclosure, a lens assembly (e.g., the lens assembly 210 or the camera module 280 in FIG. 2 and/or the lens assembly 400) and/or an electronic device (e.g., the electronic device 101 or 300 in FIG. 1, FIG. 3, or FIG. 4) may include an image sensor (e.g., the image sensor 230 or 405 in FIG. 2 or FIG. 5), and three lenses (e.g., the lenses 401, 402, and 403 in FIG. 5) sequentially arranged along an optical axis (e.g., the optical axis O in FIG. 5) from an object (e.g., the object obj in FIG. 5) side to an image sensor side, wherein, in the three lenses, a first lens (e.g., the first lens 401 in FIG. 5) disposed on the object side may include an object side surface (e.g., the surface indicated by "S1" in FIG. 5) convex toward the object and an image sensor side surface (e.g., the surface indicated by "S2" in FIG. 5) convex toward the image sensor while having positive power, a second lens (e.g., the second lens 402 in FIG. 5) disposed between the image sensor and the first lens may include an object side surface (e.g., the surface on which the stop is disposed in FIG. 5) concave toward the image sensor while having negative power, and a third lens (e.g., the third lens 403 in FIG. 5) disposed between the image sensor and the second lens may have negative power, and wherein the lens assembly may satisfy Conditional Expression 1 below:

$$0.1 \leq L12/L23 \leq 0.4 \quad \text{[Conditional Expression 1]}$$

wherein "L12" may be the distance or air gap between the first lens and the second lens, and "L23" may be the distance or air gap between the second lens and the third lens.

According to an embodiment, the lens assembly described above and/or the electronic device including the same may satisfy Conditional Expression 2 below.

$$0.15 \leq L23/TTL \leq 0.3 \quad \text{[Conditional Expression 2]}$$

wherein "TTL" may be the distance from the object side surface of the first lens to an imaging surface of the image sensor.

According to an embodiment, the lens assembly described above and/or the electronic device including the same may satisfy Conditional Expression 3 below.

$$3 \leq CT2/CT3 \leq 5 \quad \text{[Conditional Expression 3]}$$

wherein "CT2" may be the thickness of the second lens, and "CT3" may be the thickness of the third lens.

According to an embodiment, the lens assembly as described above and/or the electronic device including the same may further include a stop (e.g., the stop in FIG. 5) disposed on the object side surface of the second lens, and may satisfy Conditional Expression 4 below:

$$0.8 \leq StopL/TTL \leq 0.9 \quad \text{[Conditional Expression 4]}$$

wherein "StopL" may be the distance from the stop to the imaging surface of the image sensor, and "TTL" may be the distance from the object side surface of the first lens to the imaging surface of the image sensor.

According to an embodiment, the third lens may have a meniscus shape including an object side surface (e.g., the surface indicated by "S7" in FIG. 5) concave toward the image sensor at a point intersecting the optical axis, and an image sensor side surface (e.g., the surface indicated by "S10" in FIG. 5) concave toward the object at a point intersecting the optical axis.

According to an embodiment, the lens assembly described above and/or the electronic device including the same may satisfy Conditional Expression 5 below.

$$100 \leq vd1+vd2+vd3 \leq 140 \quad \text{[Conditional Expression 5]}$$

wherein "vd1" may be the Abbe number of the first lens, "vd2" may be the Abbe number of the second lens, "vd3" may be the Abbe number of the third lens.

According to an embodiment, the lens assembly as described above and/or the electronic device including the same may satisfy Conditional Expressions 6 and Conditional Expressions 7 below:

$$0.15 \leq L23/TTL \leq 0.3 \quad \text{[Conditional Expression 6]}$$

$$3 \leq CT2/CT3 \leq 5 \quad \text{[Conditional Expression 7]}$$

wherein "TTL" may be the distance from the object side surface of the first lens to the imaging surface of the image sensor, "CT2" may be the thickness of the second lens, and "CT3" may be the thickness of the third lens.

According to an embodiment, the lens assembly as described above and/or the electronic device including the same may further include an infrared cut filter (e.g., the infrared cut filter 404 in FIG. 5) disposed between the third lens and the image sensor.

According to an embodiment, the infrared cut filter may be disposed to directly face the image sensor while being disposed to directly face the third lens.

According to an embodiment, the second lens may be disposed to directly face the third lens while being disposed to directly face the first lens.

According to an embodiment of the disclosure, an electronic device (e.g., the electronic device 101 or 300 in FIG.

1, FIG. 3, or FIG. 4) according to various embodiments of the disclosure may include a housing (e.g., the housing 310 in FIG. 3 or FIG. 4), a display (e.g., the display module 160 in FIG. 1 or the display 301 in FIG. 3) disposed on one surface of the housing, a lens assembly (e.g., the lens assembly 210 or camera module 280 in FIG. 2 and/or the lens assembly 400 in FIG. 5) configured to receive or detect at least a portion of light incident on the one surface of the housing or the other surface facing away from the one surface, wherein the lens assembly includes an image sensor (e.g., the image sensor 210 or 405 in FIG. 2 or FIG. 5) and three lenses (e.g., the lenses 401, 402, and 403 in FIG. 5) sequentially arranged along an optical axis (e.g., the optical axis O in FIG. 5) from an object (e.g., the object obj) side to an image sensor side, and a processor (e.g., the processor 120 in FIG. 1 or the image signal processor 260 in FIG. 2) configured to acquire an image based on the light received or detected via the lens assembly, wherein, in the three lenses, a first lens (e.g., the first lens 401 in FIG. 5) disposed on the object side may include an object side surface (e.g., the surface indicated by "S1" in FIG. 5) convex toward the object and an image sensor side surface (e.g., the surface indicated by "S2" in FIG. 5) convex toward the image sensor while having positive power, a second lens (e.g., the second lens 402 in FIG. 5) disposed between the image sensor and the first lens may include an object side surface (e.g., the surface on which the stop is disposed in FIG. 5) concave toward the image sensor while having negative power, and a third lens (e.g., the third lens 403 in FIG. 5) disposed between the image sensor and the second lens may have negative power, and wherein the lens assembly may satisfy Conditional Expression 8 below:

$0.1 \leq L12/L23 \leq 0.4$      [Conditional Expression 8]

wherein "L12" may be the distance or air gap between the first lens and the second lens, and "L23" may be the distance or air gap between the second lens and the third lens.

According to an embodiment, the lens assembly may satisfy Conditional Expression 9 below:

$0.15 \leq L23/TTL \leq 0.3$      [Conditional Expression 9]

wherein "TTL" may be the distance from the object side surface of the first lens to an imaging surface of the image sensor.

According to an embodiment, the lens assembly may satisfy Conditional Expression 10 below:

$3 \leq CT2/CT3 \leq 5$      [Conditional Expression 10]

wherein "CT2" may be the thickness of the second lens, and "CT3" may be the thickness of the third lens.

According to an embodiment, the lens assembly may further include a stop (e.g., the stop in FIG. 5) disposed on the object side surface of the second lens, and the lens assembly may satisfy Conditional Expression 11 below:

$0.8 \leq StopL/TTL \leq 0.9$      [Conditional Expression 11]

wherein "StopL" may be the distance from the stop to the imaging surface of the image sensor, and "TTL" may be the distance from the object side surface of the first lens to the imaging surface of the image sensor.

According to an embodiment, the third lens may have a meniscus shape including an object side surface (e.g., the surface indicated by "S7" in FIG. 5) concave toward the image sensor at a point interesting the optical axis, and an image sensor side surface (e.g., the surface indicated by "S10" in FIG. 5) concave toward the object at a point intersecting the optical axis.

According to an embodiment, the lens assembly may satisfy Conditional Expression 12 below:

$100 \leq vd1+vd2+vd3 \leq 140$      [Conditional Expression 12]

wherein "vd1" may be the Abbe number of the first lens, "vd2" may be the Abbe number of the second lens, "vd3" may be the Abbe number of the third lens.

According to an embodiment, the lens assembly may satisfy Conditional Expressions 13 and Conditional Expressions 14 below $0.15 \leq L23/TTL \leq 0.3$      [Conditional Expression 13]

$3 \leq CT2/CT3 \leq 5$      [Conditional Expression 14]

wherein "TTL" may be the distance from the object side surface of the first lens to the imaging surface of the image sensor, "CT2" may be the thickness of the second lens, and "CT3" may be the thickness of the third lens.

According to an embodiment, the lens assembly may further include an infrared cut filter (e.g., the infrared cut filter 404 in FIG. 5) disposed between the third lens and the image sensor.

According to an embodiment, the infrared cut filter may be disposed to directly face the image sensor while being disposed to directly face the third lens.

According to an embodiment, the second lens may be disposed to directly face the third lens while being disposed to directly face the first lens.

Although the disclosure has been described with reference to various embodiments as an example, it should be understood that the various embodiments are intended to be exemplary and are not limiting the disclosure. It will be apparent to those skilled in the art that various changes can be made in form and detail without departing from the overall scope of the disclosure, including the appended claims and equivalents to the same.

What is claimed is:

1. A lens assembly comprising:
an image sensor; and
three lenses sequentially arranged along an optical axis from an object side to an image sensor side,
wherein, in the three lenses, a first lens disposed on the object side includes an object side surface convex toward the object and an image sensor side surface convex toward the image sensor while having positive power,
a second lens disposed between the image sensor and the first lens includes an object side surface concave toward the image sensor while having negative power and an image side surface convex towards the image sensor,
a stop disposed on the object side surface of the second lens, and
a third lens disposed between the image sensor and the second lens has negative power, and
wherein the lens assembly satisfies Conditional Expression 1 below:

$0.1 \leq L12/L23 \leq 0.4$      [Conditional Expression 1]

wherein "L12" is a distance or air gap between the first lens and the second lens, and "L23" is a distance or air gap between the second lens and the third lens, and
wherein the lens assembly satisfies the following condition:

$3 \leq CT2/CT3 \leq 5$ wherein "CT2" is a thickness of the second lens, and "CT3" is a thickness of the third lens, wherein the lens assembly satisfies Conditional Expression 2 below:

$$0.15 \leq \frac{L23}{TTL} \leq 0.3 \qquad \text{[Conditional Expression 2]}$$

wherein "TTL" is a distance from the object side surface of the first lens to an imaging surface of the image sensor, and wherein the lens assembly satisfies Conditional Expression 4 below:

$$0.8 \leq \frac{StopL}{TTL} \leq 0.9 \qquad \text{[Conditional Expression 4]}$$

wherein "StopL" is a distance from the stop to an imaging surface of the image sensor, and "TTL" is a distance from the object side surface of the first lens to the imaging surface of the image sensor.

2. The lens assembly of claim 1, wherein the third lens has a meniscus shape including an object side surface concave toward the image sensor at a point intersecting the optical axis, and an image sensor side surface concave toward the object at a point intersecting the optical axis.

3. The lens assembly of claim 1, wherein the lens assembly satisfies Conditional Expression 5 below:

$$100 \leq vd1+vd2+vd3 \leq 140 \qquad \text{[Conditional Expression 5]}$$

wherein "vd1" is an Abbe number of the first lens, "vd2" is an Abbe number of the second lens, "vd3" is an Abbe number of the third lens.

4. The lens assembly of claim 1, further comprising:
an infrared cut filter disposed between the third lens and the image sensor.

5. The lens assembly of claim 4, wherein the infrared cut filter is disposed to directly face the image sensor while being disposed to directly face the third lens.

6. The lens assembly of claim 5, wherein the second lens is disposed to directly face the third lens while being disposed to directly face the first lens.

7. An electronic device comprising:
a housing:
a display device mounted on one surface of the housing:
a lens assembly configured to receive or detect at least a portion of light incident on the one surface of the housing or another surface facing away from the one surface, wherein the lens assembly includes an image sensor and three lenses sequentially arranged along an optical axis from an object side to an image sensor side; and
a processor configured to acquire an image based on the light received or detected via the lens assembly,
wherein, in the three lenses, a first lens disposed on the object side includes an object side surface convex toward the object and an image sensor side surface convex toward the image sensor while having positive power,
a second lens disposed between the image sensor and the first lens includes an object side surface concave toward the image sensor while having negative power and an image side surface convex towards the image sensor,
a stop disposed on the object side surface of the second lens, and
a third lens disposed between the image sensor and the second lens has negative power, and
wherein the lens assembly satisfies Conditional Expression 8 below:

$$0.1 \leq L12/L23 \leq 0.4 \qquad \text{[Conditional Expression 8]}$$

wherein "L12" is a distance or air gap between the first lens and the second lens, and "L23" is a distance or air gap between the second lens and the third lens, and
wherein the lens assembly satisfies the following condition:

$$3 \leq CT2/CT3 \leq 5$$

wherein "CT2" is a thickness of the second lens, and "CT3" is a thickness of the third lens, $$0.15 \leq \frac{L23}{TTL} \leq 0.3 \qquad \text{[Conditional Expression 2]}$$

wherein "TTL" is a distance from the object side surface of the first lens to an imaging surface of the image sensor, and
wherein the lens assembly satisfies Conditional Expression 4 below:

$$0.8 \leq \frac{StopL}{TTL} \leq 0.9 \qquad \text{[Conditional Expression 4]}$$

wherein "StopL" is a distance from the stop to an imaging surface of the image sensor, and "TTL" is a distance from the object side surface of the first lens to the imaging surface of the image sensor.

8. The electronic device of claim 7, wherein the third lens has a meniscus shape including an object side surface concave toward the image sensor at a point intersecting the optical axis, and an image sensor side surface concave toward the object at a point intersecting the optical axis.

9. The electronic device of claim 7, wherein the lens assembly satisfies Conditional Expression 12 below:

$$100 \leq vd1+vd2+vd3 \leq 140 \qquad \text{[Conditional Expression 12]}$$

wherein "vd1" is an Abbe number of the first lens, "vd2" is an Abbe number of the second lens, "vd3" is an Abbe number of the third lens.

10. The electronic device of claim 7, wherein the lens assembly further includes an infrared cut filter disposed between the third lens and the image sensor.

11. The electronic device of claim 10, wherein the infrared cut filter is disposed to directly face the image sensor while being disposed to directly face the third lens.

12. The electronic device of claim 11, wherein the second lens is disposed to directly face the third lens while being disposed to directly face the first lens.

* * * * *